United States Patent
Stavale (10) Patent No.: US 10,451,471 B2
(45) Date of Patent: Oct. 22, 2019

(54) METHOD OF DETERMINING PUMP FLOW IN TWIN SCREW POSITIVE DISPLACEMENT PUMPS

(71) Applicant: ITT Manufacturing Enterprises LLC., Wilmington, DE (US)

(72) Inventor: Anthony E. Stavale, Union, KY (US)

(73) Assignee: ITT Manufacturing Enterprises LLC, Wilmington, DE (US)

(*) Notice: Subject to any disclaimer, the term of this patent is extended or adjusted under 35 U.S.C. 154(b) by 451 days.

(21) Appl. No.: 14/826,616

(22) Filed: Aug. 14, 2015

(65) Prior Publication Data
US 2016/0041026 A1 Feb. 11, 2016

Related U.S. Application Data (63) Continuation-in-part of application No. 13/859,936, filed on Apr. 10, 2013, now Pat. No. 9,678,511.
(Continued)

(51) Int. Cl.
*G01F 25/00* (2006.01)
*F04C 2/16* (2006.01)
(Continued)

(52) U.S. Cl.
CPC ............ *G01F 25/0007* (2013.01); *F04C 2/16* (2013.01); *F04C 14/28* (2013.01); *G05D 7/0676* (2013.01);
(Continued)

(58) Field of Classification Search
CPC ..... G01F 25/0007; G05D 7/0676; F04C 2/16; F04C 14/28; F04C 2270/20;
(Continued)

(56) References Cited

U.S. PATENT DOCUMENTS 3,656,583 A * 4/1972 Hornbeck ................. F02C 1/02
 184/6.11
4,614,162 A * 9/1986 Ryan .................... A21C 15/002
 118/19
(Continued)

FOREIGN PATENT DOCUMENTS

CN 1469093 A 1/2004
CN 101737322 A 6/2010
(Continued)

OTHER PUBLICATIONS

"All you need to know . . . ",2002, ALfa Laval, Second edition, pp. 8-9.*
EP2014919 English language Abstract (2 pages).

*Primary Examiner* — Thomas C Lee
*Assistant Examiner* — Alan Chu
(74) *Attorney, Agent, or Firm* — Moritt Hock & Hamroff LLP; Bret P. Shapiro (57) ABSTRACT

Techniques are provided for tuning a twin screw positive displacement pump having a signal processor with a signal processor to receive signaling containing information about actual pump performance data for actual rated conditions captured during a tuning function related to the operation of a twin screw positive displacement pump; and determine corrected pump performance data to operate the rotary positive displacement pump by compensating pump performance data being used for operating the twin screw positive displacement pump based at least partly on the actual pump performance data for the actual rated conditions captured during the tuning function. The corrected pump performance data includes corrected published pump performance data having a corrected published rated power and slip factor, and the actual pump performance data contains information about actual power, specific gravity and viscosity related to the operation of the twin screw positive displacement pump (Continued)

and received from a pump controller or controlling device, including a variable frequency drive.

42 Claims, 2 Drawing Sheets

Related U.S. Application Data

(60) Provisional application No. 61/623,155, filed on Apr. 12, 2012.

(51) Int. Cl.
*F04C 14/28* (2006.01)
*G05D 7/06* (2006.01)

(52) U.S. Cl.
CPC .... *F04C 2240/403* (2013.01); *F04C 2270/02* (2013.01); *F04C 2270/03* (2013.01); *F04C 2270/052* (2013.01); *F04C 2270/20* (2013.01); *F04C 2270/80* (2013.01)

(58) Field of Classification Search
CPC ............ F04C 2240/403; F04C 2270/03; F04C 2270/80; F04C 2270/052; F04C 2270/02
USPC ........................................................ 700/282
See application file for complete search history.

(56) References Cited

U.S. PATENT DOCUMENTS

| 5,307,288 | A | 4/1994 | Haines |
| 6,220,747 | B1* | 4/2001 | Gosselin ........... B01F 15/00253 |
| | | | 137/3 |
| 6,591,697 | B2 | 7/2003 | Henyan |
| 7,945,411 | B2 | 5/2011 | Kernan et al. |
| 2002/0001527 | A1 | 1/2002 | Beller et al. |
| 2003/0194326 | A1* | 10/2003 | Bettenhausen ..... F02D 41/2435 |
| | | | 417/53 |
| 2004/0064292 | A1 | 4/2004 | Beck et al. |
| 2007/0212210 | A1* | 9/2007 | Kernan ................. F04D 27/001 |
| | | | 415/1 |
| 2007/0212229 | A1* | 9/2007 | Stavale .............. F04D 15/0088 |
| | | | 417/42 |
| 2009/0198350 | A1* | 8/2009 | Thiele .................. G05B 13/042 |
| | | | 700/30 |
| 2011/0293441 | A1* | 12/2011 | Anderson ............ F01C 21/002 |
| | | | 417/279 |

FOREIGN PATENT DOCUMENTS

| CN | 201794770 U | 4/2011 |
| CN | 201925167 U | 8/2011 |
| DE | 19847128 A1 | 4/2000 |
| EP | 2014919 | 1/2009 |
| GB | 2352533 | 1/2001 |
| WO | 2005085772 | 9/2005 |
| WO | 20130155140 A2 | 10/2013 |

* cited by examiner

Apparatus 10

A signal processor 12 configured to

Receive signaling containing information about actual pump performance data for actual rated conditions captured during a tuning function, e.g., including actual speed, actual power, specific gravity and viscosity, related to the operation of the twin screw positive displacement pump 14;

Determine corrected pump performance data, e.g., including a corrected published rated power and slip factor, to operate the twin screw positive displacement pump by compensating pump performance data being used for operating the twin screw positive displacement pump based at least partly on the actual pump performance data for the actual rated conditions captured during the tuning function;

Determine an actual flow value based at least partly on the corrected pump performance data; and Provide a control signal containing information about the actual flow value to control the operation of the twin screw positive displacement pump 14.

A twin screw positive displacement pump 14

A module 16 configured to

Provide the signaling containing information about the actual pump performance data for actual rated conditions captured during a tuning function, e.g., including the actual speed, actual power, specific gravity and viscosity; and Receive the control signal containing information about the actual flow value to control the operation of the twin screw positive displacement pump 14.

Figure 3

METHOD OF DETERMINING PUMP FLOW IN TWIN SCREW POSITIVE DISPLACEMENT PUMPS

CROSS REFERENCE TO RELATED APPLICATIONS

This application is a continuation-in-part of, and claims benefit to, U.S. patent application Ser. No. 13/859,936, filed 10 Apr. 2013, entitled "Method for determining pump flow for rotary positive displacement pumps," which itself claims benefit to provisional patent application Ser. No. 61/623,155, filed 12 Apr. 2012, which is hereby incorporated by reference in its entirety.

The parent application Ser. No. 13/859,936, is directed towards determining pump flow for rotary positive displacement pumps, e.g., for gear and progressive cavity pumps; while the present application is directed towards determining pump flow for rotary positive displacement pumps, e.g., for twin screw pumps.

BACKGROUND OF THE INVENTION

1. Field of the Invention

This application relates to a rotary positive displacement (PD) pump, such as a twin screw pump, an internal or external gear pump, a lobe pump, a vane pump or a progressive cavity pump; and more particularly, relates to techniques for tuning such a rotary PD pump in order to determine pump flow, including a twin screw PD pump.

2. Brief Description of Related Art

Many different type or kinds of pumps, including rotary positive displacement pumps, are known in the art. By way of example, some known pumps and shortcomings associated with the same are set forth below:

U.S. Pat. No. 6,591,697, entitled "Method for Determining Pump Flow Rates Using Motor Torque Measurements," which is hereby incorporated by reference in its entirety, discloses a methodology that is based on the relationship of torque and speed versus pump flow rate and the ability to regulate pump flow using a Variable Frequency Drive (VFD) to adjust centrifugal pump speed. The technique used by Mr. Henyan in the '697 patent relies on calibrating pump flow at several speeds and determining a flow value based on calibrated torque vs flow curves at several speeds. An interpolation method is used to determine flow between calibrated curves. Data for the calibrated flow curves are taken at zero flow (closed valve condition) at several speeds. A positive displacement pump cannot be operated at closed valve condition without pressure relief valves or bypass piping as the pump will continue to increase pressure and power until either a shaft or gear breaks or rupture occurs either in the system piping or pump casing. Another shortcoming is that the '697 patent relies on taking calibrated data at the factory which makes the variable frequency drive specific to the pump tested. Also, the invention has no provision for adjusting flow accuracy as pump wear occurs. Mr. Henyan's invention relates to centrifugal pumps where torque is proportional to the square of the speed change. In a rotary positive displacement pump torque is constant regardless of speed. Therefore mathematical relationships and the equations governing flow between centrifugal and rotary positive displacement pumps are completely different. Therefore, Mr. Henyan's technique is applicable to centrifugal pumps only and cannot be applied to positive displacement pumps.

U.S. Pat. No. 7,945,411 B2, entitled "Method for Determining Pump Flow Without the Use of Traditional Sensors" which is hereby incorporated by reference in its entirety, discloses a technique that samples speed and power data at closed valve condition to correct the published pump curve for actual performance. Normalized power curves along with speed and power data taken from a Variable Frequency Drive (VFD) are used to calculate flow. The technique used in the '411 patent by Mr. Kernan utilizes speed and power data at closed valve condition to adjust published pump performance for actual performance. A positive displacement pump cannot be operated at closed valve condition without a pressure relief valve or bypass piping as it will continue to increase pressure and power until either a shaft or gear breaks or rupture occurs either in the system piping or pump casing. Pump flow is calculated by a polynomial power equation and normalized power curves. In a centrifugal pump pressure varies as the square of the speed change and power varies as the cube of the speed change. A centrifugal pump is not a positive displacement machine and as such the capacity output will vary based on the resistance at the pump outlet. Less resistance will give more flow; more resistance less flow. A rotary positive displacement pump is a positive displacement machine where a defined volume of flow is positively displaced for each revolution of the pump shaft regardless of pressure at the outlet (unless blocked). For a rotary positive displacement pump flow is proportional to a speed change regardless of outlet pressure. There is slip which occurs which reduces the theoretical displacement due to clearances, pressure, viscosity and speed. Power typically is proportional to a speed change in rotary positive displacement pumps at constant pressure; in a centrifugal pump power varies as the cube of the speed change. Mathematical relationships and the equations governing flow between centrifugal and rotary positive displacement pumps are completely different. Therefore, Mr. Kernan's technique is applicable to centrifugal pumps only and cannot be applied to positive displacement pumps.

In the prior art, it is known to use calculations from resource material, e.g., a pump handbook for a positive displacement pump. However, one disadvantage with this approach is that calculation techniques such as those presented in the pump handbook require knowledge of difficult to determine variables such as pump geometry factor and slip coefficient. These calculation techniques cannot compensate for pump performance which deviates from published performance calculations.

In the prior art, it is known to use external flow meters; however, external flow meters can add cost and complexity to the overall drive system.

None of the aforementioned techniques described herein may be used for determining pump flow in rotary positive displacement pumps, as set forth below and herein.

SUMMARY OF THE INVENTION

While the calculation techniques covering rotary gear and progressive cavity pumps are similar to twin screw pumps, the calculation procedure has been found to be less accurate when used with twin screw pumps. The main difference is that no correction or compensation is required for published rated flow based on corrected rated power. In addition, rated slip factor is compensated based on corrected rated power only; no flow compensation is required. In view of this, the present invention provides new and unique techniques for tuning twin screw positive displacement pumps.

This invention overcomes the aforementioned shortcomings by introducing a tune function which corrects the calculated flow value based on published performance data to reflect actual pump performance. Slip coefficients may be automatically adjusted based on slip rules which compensate changes in known variables such as torque, speed and viscosity.

Figure 1:
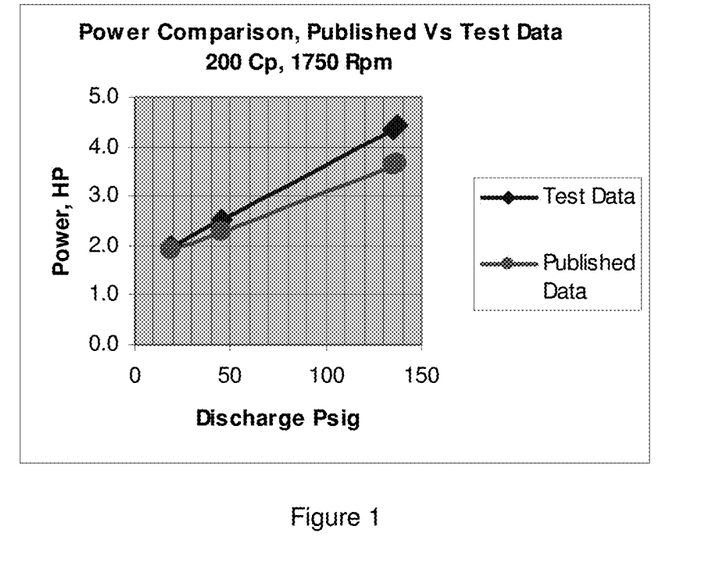
FIG. 1 is a graph of power (HP) versus discharge pressure (PSIG) related to a power comparison of published versus test data at 200 Cp, 1750 Rpm for a rotary positive displacement pump.
Figure 2:
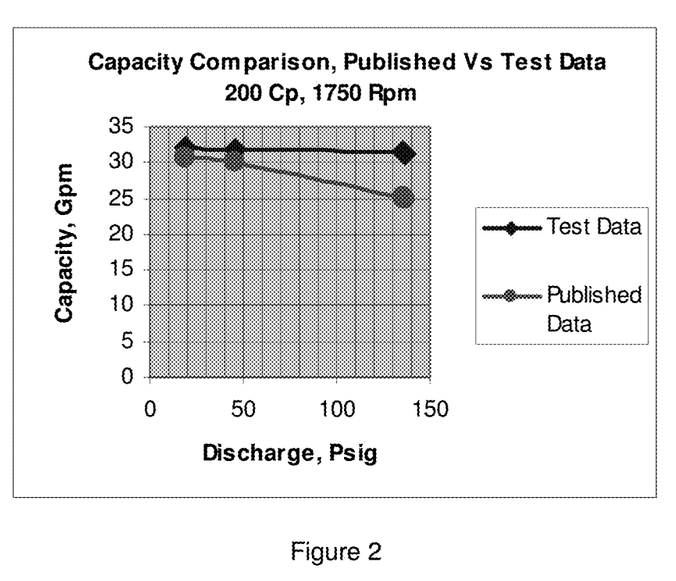
FIG. 2 is a graph of capacity (GPM) versus discharge pressure (PSIG) for a capacity comparison of published versus test data at 200 Cp, 1750 Rpm for a rotary positive displacement pump.

Published performance for certain types of rotary positive displacement pumps have been found to differ from actual performance. FIGS. 1 and 2 show a comparison for capacity and power between published performance vs. test data for a typical progressive cavity pump.

In summary, the technique according to the present invention requires an input of pump parameters which are readily accessible to pump users such as pump type, rated flow, rated speed, rated power, rated viscosity and no slip flow. Speed and power data received in signaling taken from a Variable Frequency Drive (VFD) along with specific gravity and viscosity data may be used to calculate and compensate slip flow at varying conditions. The slip flow can then be deducted from the theoretical displacement flow to determine an actual flow value. In constant temperature applications where specific gravity and viscosity are constant, the method of flow calculation becomes sensorless. For applications with varying temperature, a simple temperature measurement device is required to compensate changing conditions.

The Apparatus

By way of example, and according to some embodiments, the present invention may take the form of apparatus comprising a signal processor that may be configured to:
receive signaling containing information about actual pump performance data for actual rated conditions captured during a tuning function related to the operation of a twin screw positive displacement pump; and
determine corrected pump performance data to operate the twin screw positive displacement pump by compensating pump performance data being used for operating the twin screw positive displacement pump based at least partly on the actual pump performance data for actual rated conditions captured during a tuning function.

According to some embodiments of the present invention, the corrected pump performance data may include corrected published pump performance data having a corrected published rated power and a rated slip factor which is compensated for actual rated conditions.

According to some embodiments of the present invention, the actual pump performance data may include information about actual power, actual specific gravity and actual viscosity related to the operation of the twin screw positive displacement pump, e.g., in the signaling received from a pump controller or controlling device, such as a variable frequency drive (VFD) or programmable logic controller (PLC).

According to some embodiments of the present invention, the signal processor may be configured to use a value for a rated value for the twin screw positive displacement pump based upon published pump performance data.

According to some embodiments of the present invention, the signal processor may be configured to provide a control signal containing information about the actual flow value to control the operation of the twin screw positive displacement pump.

According to some embodiments of the present invention, the signal processor may be configured to determine the corrected published rated power, e.g., by compensating a published rated power based at least partly on actual power, actual specific gravity and actual viscosity at the actual rated conditions.

According to some embodiments of the present invention, the signal processor may be configured to determine a rated slip factor, e.g., by compensating for the actual rated conditions based at least partly on the rated flow and a corrected rated torque.

According to some embodiments of the present invention, the signal processor may be configured to determine an actual flow value based at least partly on deducting the corrected rated slip flow based on slip rules for the operating condition as shown in Table IB for the twin screw PD pump type from a theoretical displacement flow.

According to some embodiments of the present invention, the signal processor may be configured to activate the tune function and replace the published values for rated power and the rated slip factor (calculated from published data) being used for operating the twin screw positive displacement pump with the corrected rated power and rated slip factor compensated for the actual rated conditions, and to use the corrected rated power and the rated slip factor compensated for the actual rated conditions until another tune function is initiated.

According to some embodiments of the present invention, the signaling may contain information about pump parameters, including some combination of a pump type, a rated flow, a published rated speed, a published rated power, a published rated viscosity, a published rated specific gravity and no slip flow, and information about actual speed and power from a variable frequency drive (VFD) along with actual specific gravity and viscosity data; and the signal processor is configured to determine a corrected slip flow (determined from slip rules) or factor based at least partly on the signaling. The signal processor may also be configured to determine an actual flow value based at least partly on deducting the corrected rated slip flow or factor from a theoretical displacement flow or factor.

According to some embodiments of the present invention, the signal processor may be configured to determine the corrected rated slip flow based on slip rules for the operating condition as shown in Table IB below for the twin screw PD pump type or factor without using sensors based at least partly on a constant temperature application where specific gravity and viscosity are substantially constant. Alternatively, in applications with varying temperature, the signal processor may be configured to receive a temperature measurement and determine the corrected rated slip flow (determined from slip rules) or factor by compensating changing conditions, including specific gravity and viscosity, based at least partly on the same.

According to some embodiments of the present invention, the signal processor may be configured to determine the corrected published rated power based at least partly on the following equation:

$$RTD\ HP_{CORR} = HP_{ACT} \times (SG_{RTD}/SG_{ACT})/(VISC_{ACT}/VISC_{RTD})^N,$$

where:
RTD $HP_{CORR}$ is the corrected published rated power in the form of rated hp corrected for specific gravity and viscosity,
$HP_{ACT}$ is the actual power at rated conditions, e.g., captured during the tune process,
$SG_{RTD}$ is the rated specific gravity of the pumped liquid, $SG_{ACT}$ is the actual specific gravity of the pumped liquid, e.g., captured during the tune process, $VISC_{RTD}$ is the rated viscosity of the pumped liquid, $VISC_{ACT}$ is the actual viscosity of the pumped liquid, e.g., captured during the tune process, and N is an exponent which varies by the type of pump.

For twin screw PD pumps, the exponent N may equal about 0.275. The exponent of 0.275 is a default value although the scope of the invention is intended to include embodiments having a different exponent consistent with that now known or later developed in the future.

According to some embodiments of the present invention, the signal processor may be configured to determine the rated slip factor compensated for the actual rated conditions based at least partly on the following equation:

$$KS = (VISC_{RTD} \times Q_{NO\ SLIP} \times (Q_{NO\ SLIP} - Q_{RATED})) / (75.415 \times K_G \times (N_{RATED}) \times T_{RTD\ CORR}),$$

where:

KS is the rated slip factor compensated for the actual rated conditions, $VISC_{RTD}$ is the published pump rated viscosity, $Q_{NO\ SLIP}$ is the flow in gpm at rated speed and rated viscosity at 0 psid differential pressure, $Q_{RTD}$ is the rated flow for the application from the rating curve. No correction or compensation is used.

$K_G = 0.004329$, a design constant, $N_{RATED}$ = Rated Pump Speed for the application, and $T_{RTD\ CORR}$ = Corrected Rated Torque in Ft-Lbs (US), which is determined as follows: $T_{RTD\ CORR} = (5252 \times RTD\ HP_{CORR}) / N_{RTD}$.

According to some embodiments of the present invention, the signal processor may be configured to determine an actual flow value for the rotary positive displacement pump based at least partly on the following equation:

$$Q_{ACT\ CORR} = (Q_{NO\ SLIP} \times ((N_{MOTOR}/RATIO)/N_{RATED})) - (((75.415 \times K_G \times KS_{CORR}) \times (N_{MOTOR}/RATIO) \times TACT_{CORR}) / (VISCOSITY_{ACT} \times Q_{NO\ SLIP}),$$

where:

$Q_{NO\ SLIP}$ is the flow in gpm at rated speed and rated viscosity at 0 psid differential pressure, $N_{MOTOR}$ = the current motor speed, RATIO = the ratio of speed reduction if a gear reducer is used. If no gear reducer is used than the value of the RATIO=1.0.

$N_{RATED}$ = the Rated Pump Speed for the application, $K_G = 0.004329$, a design constant, $KS_{CORR}$ is the corrected rated slip factor based on the slip rules shown in Table IB (See Section B below for twin screw pumps), $T_{ACT\ CORR}$ = Torque in Ft-Lbs (US), where $T_{ACT\ CORR} = (5252 \times HP_{ACT\ CORR})/N_{ACT}$, and $$HP_{ACT\ CORR} = HP_{ACT} \times (SG_{RTD}/SG_{ACT}),$$

$HP_{ACT}$ = Actual motor power, $N_{ACT}$ = Actual pump speed, and $VISC_{ACT}$ is the actual viscosity of the pumped liquid.

According to some embodiments of the present invention, the signal processor may also be configured as, or take the form of, a controller or control module that controls the operation of the rotary positive displacement pump.

According to some embodiments of the present invention, the apparatus may include the twin screw positive displacement pump itself in combination with the signal processor, including where the twin screw positive displacement pump takes the form of twin screw positive displacement pumps either now known or later developed in the future.

The Method

According to some embodiments, the present invention may take the form of a method comprising steps for receiving with a signal processor signaling containing information about actual pump performance data for actual rated conditions captured during a tuning function related to the operation of a twin screw positive displacement pump; and determining with the signal processor corrected published pump performance data to operate the twin screw positive displacement pump by compensating published pump performance data being used for operating the twin screw positive displacement pump based at least partly on the actual pump performance data for the actual rated conditions captured during the tuning function.

According to some embodiments of the present invention, the method may also include implementing one or more of the features set forth above.

DETAILED DESCRIPTION OF THE INVENTION

Figure 3:
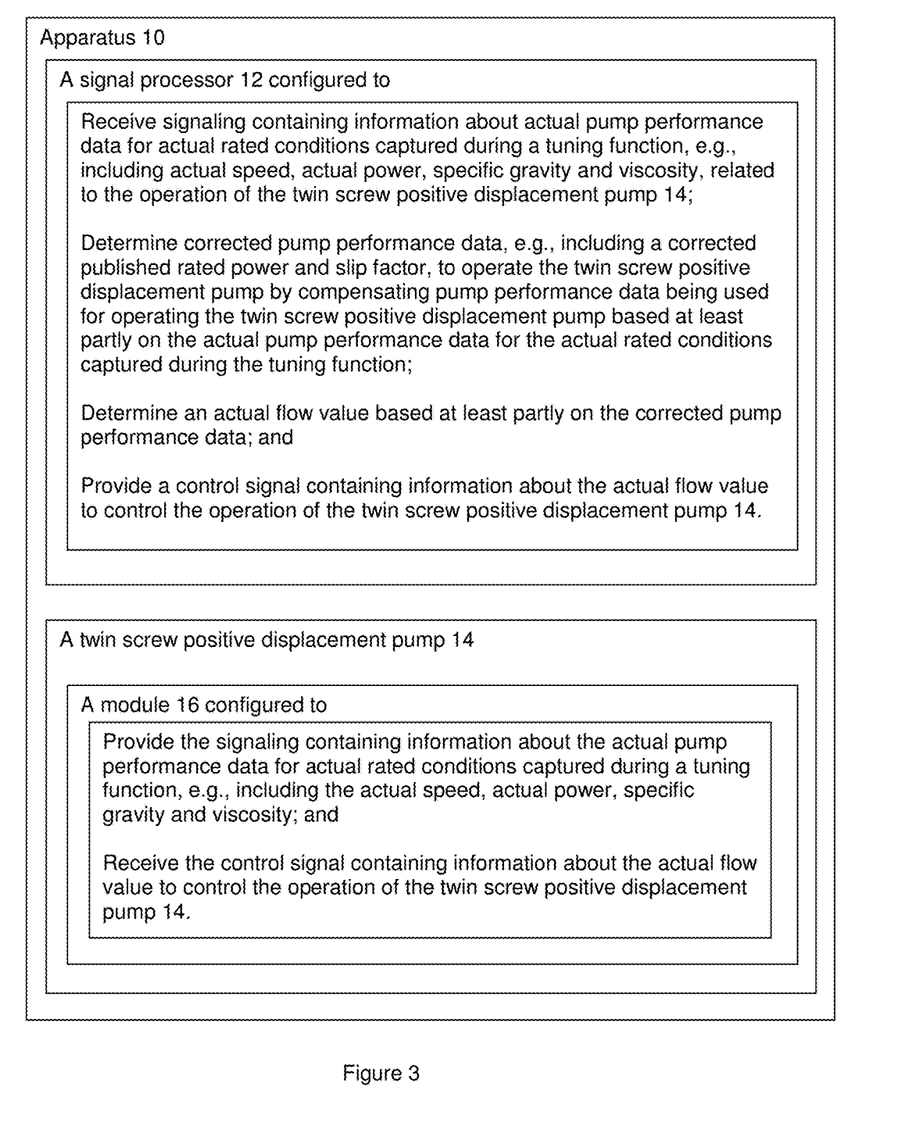
FIG. 3 is a block diagram of apparatus according to some embodiments of the present invention.

By way of example, as shown in FIG. 3, according to some embodiments, the present invention may take the form of apparatus 10 that includes a signal processor 12 that may be configured to control and protect the operation of a rotary positive displacement pump 14, e.g., which may include, or take the form of, a twin screw pump, an internal or external gear pump, a lobe pump, a vane pump or a progressive cavity pump.

By way of example, the signal processor 12 may be configured to receive signaling containing information about actual pump performance data for actual rated conditions captured during a tuning function related to the operation of the rotary positive displacement pump 14 and determine corrected published pump performance data to operate the rotary positive displacement pump by compensating published pump performance data being used for operating the rotary positive displacement pump based at least partly on the actual pump performance data for the actual rated conditions captured during the tuning function.

For rotary PD, magnetic drive, progressive cavity and magnetic drive progressive cavity pumps disclosed below in relation to Section A, the signal processor 12 may also be configured to determine an actual flow value, e.g., based at least partly on the corrected published pump performance data. In contrast, for twin screw positive displacement pumps disclosed below in Section B, the signal processor 12 may be configured to use a value for a rated flow, e.g., based upon published pump performance data. In either case, the signal processor 12 may be configured to provide a control signal containing information about a respective flow control value to control the operation of these types of rotary positive displacement pumps.

The rotary positive displacement pump 14 may include a module 16 configured to provide the signaling containing information about actual pump performance data for actual rated conditions captured during a tuning function related to the operation of the rotary positive displacement pump 14, and may also be configured to receive the control signal containing information to control the operation of these types of rotary positive displacement pump 14.

By way of example, for rotary PD, magnetic drive, progressive cavity and magnetic drive progressive cavity pumps, the signal processor 12 may be implemented consistent with that set forth below in Section A, and for twin screw pumps, the signal processor 12 may be implemented consistent with that set forth below in Section B, as follows:

A. Implementation for Rotary PD, Magnetic Drive, Progressive Cavity and Magnetic Drive Progressive Cavity Pumps For gear and progressive cavity pumps, the control logic according to the present invention works by compensating published values of rated power, rated flow and rated slip factor for actual rated conditions, as follows:

The published rated power may be compensated for actual power, actual specific gravity and actual viscosity at rated conditions. This becomes the corrected rated power.

The published rated flow may be compensated for actual rated conditions based on the corrected rated power. This becomes the corrected rated flow.

The rated slip factor, calculated from published data, may be compensated for actual rated conditions based on the corrected rated power and corrected rated flow.

Once these values are calculated and a tune function is activated the published values for Rated HP, Rated Flow and Rated Slip Factor are replaced by the corresponding compensated or corrected values. These compensated or corrected values are saved and do not change unless another tune function is initiated. Note the tune function is typically activated while the pump is operating at rated speed and rated conditions.

By way of example, the technique of compensation and flow calculation may consist of the following steps:

a) Rated HP Compensation (RTD $HP_{CORR}$)

For instance, the signal processor 12 may be configured to determine the corrected published rated power based at least partly on the following equation:

$$RTD\ HP_{CORR} = HP_{ACT} \times (SG_{RTD}/SG_{ACT})/(VISC_{ACT}/VISC_{RTD})^N,$$

where:

$RTD\ HP_{CORR}$ is the rated hp corrected for specific gravity and viscosity, $HP_{ACT}$ is the actual power at rated conditions, $SG_{RTD}$ is the rated specific gravity of the pumped liquid, $SG_{ACT}$ is the actual specific gravity of the pumped liquid, $VISC_{RTD}$ is the rated viscosity of the pumped liquid, $VISC_{ACT}$ is the actual viscosity of the pumped liquid, and N is an exponent which varies by the type of pump.

By way of example, for rotary PD pumps such as gear, vane and lobe, the exponent N equals about 0.10, and for progressive cavity pumps, the exponent N equals about 0.275.

The scope of the invention is not intended to be limited to the specific aforementioned equation and parameters set forth above to determine the corrected published rated power. For example, embodiments are envisioned in which variations of the aforementioned equation and/or parameters may be used to determine the corrected published rated power consistent with that now known or later developed in the future.

b) Rated Flow Compensation ($Q_{RATEDCORR}$)

For instance, the signal processor 12 may be configured to determine the corrected published rated flow based at least partly on the following equation:

$$Q_{RATEDCORR} = (RTD\ HP_{CORR}/RTD\ HP) \times Q\ RTD,$$

Note that $Q_{RATEDCORR}$ is calculated at rated speed.

Where:

$Q_{RATEDCORR}$ is the corrected rated flow $RTD\ HP_{CORR}$ is the rated hp corrected for specific gravity and viscosity, $RTD\ HP$ is the rated hp for the application $Q\ RTD$ is the rated flow for the application The scope of the invention is not intended to be limited to the specific aforementioned equation and parameters set forth above to determine the corrected published rated flow. For example, embodiments are envisioned in which variations of the aforementioned equation and/or parameters may be used to determine the corrected published rated flow consistent with that now known or later developed in the future.

c) Rated Slip Factor Compensation (KS):

For instance, the signal processor 12 may be configured to determine the rated slip factor KS compensated for the actual rated conditions based at least partly on the following equation:

$$KS = (VISC_{RTD} \times Q_{NO\ SLIP} \times (Q_{NO\ SLIP} - Q_{RATED\ CORR})/ (75.415 \times K_G \times (N_{RTD}) \times T_{RTD\ CORR}),$$

where:

KS is the rated slip factor compensated for the actual rated conditions, $Q_{NO\ SLIP}$ is the flow in Gpm at rated speed and rated viscosity at 0 psid differential pressure, $Q_{RATEDCORR}$ is the corrected rated flow, $K_G = 0.004329$, a design constant, $N_{RTD}$ = Rated Pump Speed for the application, and $T_{RTD\ CORR}$ = Corrected Rated Torque in Ft-Lbs (US), which is calculated as follows: $T_{RTD\ CORR} = (5252 \times RTD\ HP_{CORR})/N_{RTD}$, where $RTD\ HP_{CORR}$ is the rated hp corrected for specific gravity and viscosity.

The scope of the invention is not intended to be limited to the specific aforementioned equation and parameters set forth above to determine the rated slip factor. For example, embodiments are envisioned in which variations of the aforementioned equation and/or parameters may be used to determine the rated slip factor consistent with that now known or later developed in the future.

d) Tune Function Activation

To calculate and save values calculated in steps a-c, the signal processor 12 is configured to activate the tune function process while the pump is stable and operating at rated conditions. The tune function process is seamless to the user. Tuning samples the actual rated conditions without changing operating conditions or pump speed. Once tuning is completed, the values for $RTD\ HP_{CORR}$, $Q_{RATED\ CORR}$ and KS are saved. These values do not change unless another tune function process is re-initiated.

Periodically as wear occurs, pump flow accuracy can be restored by re-activating this parameter when operating at rated conditions.

e) The Actual Flow Calculation

For instance, the rated slip factor, KS, may be corrected for changing variables due to operating conditions by the slip rules for rotary and progressive cavity pumps as shown in Tables IA and IIA. The corrected slip factor becomes $KS_{CORR}$.

The signal processor 12 may be configured to determine an actual flow value for the rotary positive displacement pump based at least partly on the following equation:

$$Q_{ACT\ CORR}=(Q_{NO\ SLIP}\times((N_{MOTOR}/\text{RATIO})/N_{RTD}))-\\ (((75.415\times K_G\times KS_{CORR})\times(N_{MOTOR}/\text{RATIO})\times\\ T_{ACT\ CORR})/(VISC_{ACT}\times Q_{NO\ SLIP}),$$

where:

$Q_{NO\ SLIP}$ is the flow in Gpm at rated speed and rated viscosity at 0 psid differential pressure, $N_{MOTOR}$=current motor speed, RATIO=the ratio of speed reduction if a gear reducer is used (If no gear reducer is used than the value of the RATIO=1.0), $N_{RTD}$=Rated Pump Speed for the application, $K_G$=0.004329, a design constant, $VISC_{ACT}$ is the actual viscosity of the pumped liquid, $T_{ACT\ CORR}$=Torque in Ft-Lbs (US), which is calculated as follows: $T_{ACT\ CORR}=(5252\times HP_{ACT\ CORR})/N_{ACT}$, where $HP_{ACT\ CORR}=HP_{ACT}\times(SG_{RTD}/SG_{ACT})$, and $KS_{CORR}$=corrected slip factor based on slip rules for the operating condition as shown in Tables IA and IIA.

For constant temperature applications, a specific gravity value is not required and $HP_{ACT\ CORR}=HP_{ACT}$, where $HP_{ACT}$=Actual motor power, and $N_{ACT}$=Actual pump speed.

Adjustments to the rated slip factor, KS, may be made by the slip rules shown below, which results in a corrected slip factor, "$KS_{CORR}$".

TABLE IA

Slip Rules for Rotary PD Pumps and
Magnetic Drive Rotary PD Pumps:

| Changing Variable | Corrected Slip Factor "$KS_{CORR}$" used in step "e" |
|---|---|
| Torque | SLIP FACTOR is Constant; $KS_{CORR}$ = KS |
| Speed | $KS_{CORR}$ = KS * $(N_{RATED}/N_{ACT})$ |
| Speed and Torque | SLIP FACTOR is Constant; $KS_{CORR}$ = KS |
| Viscosity | $KS_{CORR}$ = KS * $(Visc_{ACT}/Visc_{RATED})^{\wedge}0.5$ |
| Speed and Viscosity | $KS_{CORR}$ = KS * $(N_{RATED}/N_{ACT})$ * $(Visc_{ACT}/Visc_{RATED})^{\wedge}0.5$ |
| Torque and Viscosity | $KS_{CORR}$ = KS * $(Visc_{ACT}/Visc_{RATED})^{\wedge}0.5$ |
| Speed, Torque and Viscosity | $KS_{CORR}$ = KS * $(N_{RATED}/N_{ACT})$ * $(Visc_{ACT}/Visc_{RATED})^{\wedge}0.5$ |

TABLE IIA

Slip Rules for Progressive Cavity Pumps and
Magnetic Drive Progressive Cavity Pumps:

| Changing Variable | Corrected Slip Factor "$KS_{CORR}$" used in step "e" |
|---|---|
| Torque | SLIP FACTOR is Constant; $KS_{CORR}$ = KS |
| Speed | $KS_{CORR}$ = KS * $(N_{RATED}/N_{ACT})$ |
| Speed and Torque | SLIP FACTOR is Constant; $KS_{CORR}$ = KS |
| Viscosity | $KS_{CORR}$ = KS * $(Visc_{ACT}/Visc_{RATED})^{\wedge}0.5$ |
| Speed and Viscosity | $KS_{CORR}$ = KS * $(N_{RATED}/N_{ACT})$ * $(Visc_{ACT}/Visc_{RATED})^{\wedge}0.5$ |
| Torque and Viscosity | $KS_{CORR}$ = KS * $(Visc_{ACT}/Visc_{RATED})^{\wedge}0.5$ |
| Speed, Torque and Viscosity | $KS_{CORR}$ = KS * $(Visc_{ACT}/Visc_{RATED})^{\wedge}0.5$ |

The result of the flow calculation in step (e) is as follows: $Q_{ACT\ CORR}=Q_{ACT}$, and the $Q_{ACT\ CORR}$ is displayed as the actual flow ($Q_{ACT}$) in Gpm.

In the tables, the parameters for actual and rated pump speed are as follows:

$N_{ACT}$=Actual pump speed, and $N_{RTD}$=Rated pump speed of the application.

For magnetic drive rotary and magnetic drive progressive cavity PD pumps: $T_{ACT\ CORR}$=Torque in Ft-Lbs (US), which is calculated as follows: $T_{ACT\ CORR}=(5252\times HP_{ACT\ CORR})/N_{ACT}$, where:

$$HP_{ACT\ CORR}=(HP_{ACT}-(P_{MAG\ CORR}\times(N_{ACT}/N_{RTD})^2)\times\\ SG_{RTD}/SG_{ACT}),$$

$HP_{ACT}$=Actual motor power, and $P_{MAG\ CORR}$ is the eddy current loss in Hp at rated speed for the containment shell material used. Note for non-metallic containment shells the eddy current loss is 0 hp.

The scope of the invention is not intended to be limited to the specific aforementioned equation and parameters set forth above to determine the actual flow value. For example, embodiments are envisioned in which variations of the aforementioned equation and/or parameters may be used to determine the actual flow value consistent with that now known or later developed in the future.

In effect, this tuning methodology calculates flow for rotary positive displacement pumps such as gear pumps and progressive cavity pumps by introducing a tune function which corrects the calculated flow value based on published performance data. Additionally, slip coefficients are automatically adjusted based on slip rules which compensate changes in known variables such as torque, speed and viscosity. The approach below takes a different approach for twin screw pumps.

B. Implementation for Twin Screw Pumps

For twin screw pumps, the control logic according to the present invention works by compensating published values of rated power and rated slip factor for actual rated conditions, as follows:

The rated power may be compensated for actual power, actual specific gravity and actual viscosity at rated conditions. This becomes the corrected rated power.

The rated slip factor, calculated from published data, may be compensated for actual rated conditions based on the corrected rated power.

Once these values are calculated and a tune function is activated the published values for Rated HP, and Rated Slip Factor are replaced by the corresponding compensated or corrected values. These compensated or corrected values are saved and do not change unless another tune function is initiated. Note the tune function is typically activated while the pump is operating at rated speed and rated conditions.

By way of example, the technique of compensation and flow calculation may consist of the following steps:

a) Rated HP Compensation (RTD $HP_{CORR}$)

For instance, the signal processor 12 may be configured to determine the corrected published rated power based at least partly on the following equation:

$$RTD\ HP_{CORR}=HP_{ACT}\times(SG_{RTD}/SG_{ACT})/(VISC_{ACT}/\\ VISC_{RTD})^{\wedge}N,$$

where:

RTD $HP_{CORR}$ is the rated hp corrected for specific gravity and viscosity, $HP_{ACT}$ is the actual power at rated conditions, e.g., captured during the tune process, $SG_{RTD}$ is the rated specific gravity of the pumped liquid, $SG_{ACT}$ is the actual specific gravity of the pumped liquid, e.g., captured during the tune process, $VISC_{RTD}$ is the rated viscosity of the pumped liquid, $VISC_{ACT}$ is the actual viscosity of the pumped liquid, e.g. captured during the tune process, and N is an exponent which varies by the type of pump.

By way of example, for twin screw pumps, the exponent N equals about 0.275.

The scope of the invention is not intended to be limited to the specific aforementioned equation and parameters set forth above to determine the corrected published rated power. For example, embodiments are envisioned in which variations of the aforementioned equation and/or parameters may be used to determine the corrected published rated power consistent with that now known or later developed in the future.

b) Rated Flow Compensation

It is note that Q RTD is the rated flow for the application from the rating curve, e.g., consistent with that set forth above on section B(b). For twin screw pumps, no correction or compensation is used.

c) Rated Slip Factor Compensation (KS):

For instance, the signal processor 12 may be configured to determine the rated slip factor KS compensated for the actual rated conditions based at least partly on the following equation:

$$KS = (VISC_{RTD} \times Q_{NO\ SLIP} \times (Q_{NO\ SLIP} - Q_{RATED})) / (75.415 \times K_G \times (N_{RTD}) \times T_{RTD\ CORR}),$$

where:

KS is the rated slip factor compensated for the actual rated conditions, $Q_{NO\ SLIP}$ is the flow in Gpm at rated speed and rated viscosity at 0 psid differential pressure, As stated above, $Q_{RTD}$ is the rated flow for the application from the rating curve. No correction or compensation is used.

$K_G = 0.004329$, a design constant, $N_{RTD}$ = Rated Pump Speed for the application, and $T_{RTD\ CORR}$ = Corrected Rated Torque in Ft-Lbs (US), which is calculated as follows: $T_{RTD\ CORR} = (5252 \times RTD\ HP_{CORR})/N_{RTD}$, where RTD $HP_{CORR}$ is the rated hp corrected for specific gravity and viscosity.

The scope of the invention is not intended to be limited to the specific aforementioned equation and parameters set forth above to determine the rated slip factor. For example, embodiments are envisioned in which variations of the aforementioned equation and/or parameters may be used to determine the rated slip factor consistent with that now known or later developed in the future.

d) Tune Function Activation

To calculate and save values calculated in steps a-c, the signal processor 12 is configured to activate the tune function process while the pump is stable and operating at rated or near rated conditions. The tune function process is seamless to the user. Tuning samples the actual rated conditions without changing operating conditions or pump speed. Once tuning is completed, the values for RTD $HP_{CORR}$ and KS are saved. These values do not change unless another tune function process is re-initiated.

Periodically as wear occurs, pump flow accuracy can be restored by re-activating this parameter when operating at rated conditions.

e) The Actual Flow Calculation

For instance, the rated slip factor, KS, may be corrected for changing variables due to operating conditions by the slip rules for twin screw pumps as shown in Table IB. The corrected slip factor becomes $KS_{CORR}$.

The signal processor 12 may be configured to determine an actual flow value for the rotary positive displacement pump based at least partly on the following equation:

$$Q_{ACT\ CORR} = (Q_{NO\ SLIP} \times ((N_{MOTOR}/RATIO)/N_{RTD})) - (((75.415 \times K_G \times KS_{CORR}) \times (N_{MOTOR}/RATIO) \times T_{ACT\ CORR})/(VISC_{ACT} \times Q_{NO\ SLIP})),$$

where:

$Q_{NO\ SLIP}$ is the flow in Gpm at rated speed and rated viscosity at 0 psid differential pressure, $N_{MOTOR}$ = current motor speed, RATIO = the ratio of speed reduction if a gear reducer is used (If no gear reducer is used than the value of the RATIO=1.0), $N_{RTD}$ = Rated Pump Speed for the application, $K_G = 0.004329$, a design constant, $VISC_{ACT}$ is the actual viscosity of the pumped liquid, $T_{ACT\ CORR}$ = Torque in Ft-Lbs (US), which is calculated as follows: $T_{ACT\ CORR} = (5252 \times HP_{ACT\ CORR})/N_{ACT}$, where $HP_{ACT\ CORR} = HP_{ACT} \times (SG_{RTD}/SG_{ACT})$, and $KS_{CORR}$ = corrected slip factor based on slip rules for the operating condition as shown in Table IB.

For constant temperature applications, a specific gravity value is not required and $HP_{ACT\ CORR} = HP_{ACT}$, where $HP_{ACT}$ = Actual motor power, and $N_{ACT}$ = Actual pump speed.

Adjustments to the rated slip factor, KS, may be made by the slip rules shown below, which results in a corrected slip factor, "$KS_{CORR}$".

TABLE IB

| Slip Rules for Twin Screw PD Pumps: | |
|---|---|
| Changing Variable | Corrected Slip Factor "$KS_{CORR}$" used in step "e" |
| Torque | SLIP FACTOR is Constant; $KS_{CORR}$ = KS |
| Speed | $KS_{CORR}$ = KS * $(N_{RATED}/N_{ACT})$ |
| Speed and Torque | $KSCORR$ = KS * (NRATED/NACT) |
| Viscosity | $KS_{CORR}$ = KS * $(Visc_{ACT}/Visc_{RATED})^{0.4}$ |
| Speed and Viscosity | $KS_{CORR}$ = KS * $(N_{RATED}/N_{ACT})$ * $(Visc_{ACT}/Visc_{RATED})^{0.4}$ |
| Torque and Viscosity | $KS_{CORR}$ = KS * $(Visc_{ACT}/Visc_{RATED})^{0.4}$ |
| Speed, Torque and Viscosity | $KS_{CORR}$ = KS * $(N_{RATED}/N_{ACT})$ * $(Visc_{ACT}/Visc_{RATED})^{0.4}$ |

The result of the flow calculation in step (e) is as follows:

$Q_{ACT\ CORR} = Q_{ACT}$, and the $Q_{ACT\ CORR}$ is displayed as the actual flow ($Q_{ACT}$) in Gpm.

In the tables, the parameters for actual and rated pump speed are as follows:

NACT = Actual pump speed, and

NRTD = Rated pump speed of the application.

The scope of the invention is not intended to be limited to the specific aforementioned equation and parameters set forth above to determine the actual flow value. For example, embodiments are envisioned in which variations of the aforementioned equation and/or parameters may be used to determine the actual flow value consistent with that now known or later developed in the future.

In effect, the approach for the twin screw pump does not require flow compensation (correction) in the calculation and the slip factor calculations are different, e.g., consistent with that set forth herein. These differences improve the accuracy of the underlying tuning function for twin screw pumps, especially when compared to the tuning function used for the other rotary PD pumps disclosed in Section A.

The Signal Processor 12

The signal processor 12 performs the basic signal processing functionality of the apparatus for implementing the present invention. The signal processor 12 may be a stand alone signal processing module, form part of a controller, controller module, etc., or form part of some other module of the apparatus 10. Many different types and kind of signal processors, controllers and controller modules for controlling pumps are known in the art. Some examples are variable frequency drives and programmable logic controllers. By way of example, based on an understanding of such known signal processing modules, controllers and control modules, a person skilled in the art would be able to configure the signal processor 12 to perform the functionality consistent with that described herein, including to receive the signaling containing information about actual pump performance data for actual rated conditions captured during a tuning function related to the operation of the twin screw positive displacement pump 14; and to determine corrected pump performance data to operate the twin screw positive displacement pump 14 by compensating pump performance data being used for operating the twin screw positive displacement pump based at least partly on the actual pump performance data for actual rated conditions captured during a tuning function.

By way of still further example, the functionality of the signal processor 12 may be implemented using hardware, software, firmware, or a combination thereof, although the scope of the invention is not intended to be limited to any particular embodiment thereof. In a typical software implementation, such a module would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future.

The signal processor, controller or controller module may include other modules to perform other functionality that is known in the art, that does not form part of the underlying invention, and that is not described in detail herein.

The Periodic Tuning Functions

Moreover, as a person skilled in the art would appreciate based upon that disclosed in the present invention the twin screw positive displacement pump may be initially operated using pump performance data that may include one or more values based upon published pump performance data. In operation, the signal processor 12 may receive the signaling containing information about the actual pump performance data for the actual rated conditions, e.g., captured during a first tuning function, related to the operation of the twin screw positive displacement pump, and determine the corrected pump performance data to operate the twin screw positive displacement pump by compensating the pump performance data being used for operating the twin screw positive displacement pump based at least partly on the actual pump performance data for the actual rated conditions captured during a first tuning function.

The twin screw positive displacement pump will continue to operate using the corrected pump performance data determined, which may include one or more compensated values for the one or more values of the published pump performance data initially used.

Subsequent to the first tuning function, the signal processor 12 may receive subsequent signaling containing information about subsequent actual pump performance data for subsequent actual rated conditions, e.g., captured during a subsequent tuning function, related to the operation of the twin screw positive displacement pump, and determine subsequent corrected pump performance data to operate the twin screw positive displacement pump by compensating the corrected pump performance data being used for operating the twin screw positive displacement pump based at least partly on the subsequent actual pump performance data for actual rated conditions captured during a subsequent tuning function. The twin screw positive displacement pump will continue to operate using the subsequent corrected pump performance data determined, which may include one or more subsequently compensated values for the one or more values of the published pump performance data initially used and/or subsequently compensated. At some point during the operation of the pump, it is understood that most, if not all, of the values of the published pump performance data initially used will be replaced by the subsequent corrected pump performance data, e.g., by compensating the corrected pump performance data being used for operating the twin screw positive displacement pump based at least partly on the subsequent actual pump performance data for actual rated conditions captured during periodic repeated tuning functions.

The Rotary Positive Displacement Pump 14

The rotary positive displacement pump like element 14, and rotary positive displacement pumps in general, are known in the art, e.g., which may include a twin screw pump, an internal or external gear pump, a lobe pump, a vane pump or a progressive cavity pump, and not described in detail herein. Moreover, the scope of the invention is not intended to be limited to any particular type or kind of positive displacement machine thereof that is either now known or later developed in the future. By way of example, such rotary positive displacement pumps are understood to include a motor or motor portion for driving a pump or pump portion, and may include a module like element 16 for implementing some functionality related to controlling the basic operation of the motor for driving the pump 14. By way of example, and consistent with that set forth herein, the motor is understood to receive control signals from the signal processor in order to drive and control the rotary positive displacement pump to pump fluid. The motor is also understood to provide the signaling containing information about power, torque and speed related to the operation of the pump.

Other Possible Applications

Other possible applications include at least the following:
Rotary positive displacement pump flow calculations—flow estimations for rotary positive displacement pumps rely upon accurate power curves to estimate pump flow. Published performance for certain types of positive displacement pumps such as progressive cavity pumps have been found to differ from actual performance based on anticipated wear in the stator liner. The tune function described above will correct the calculated flow value based on published performance to reflect actual pump performance for rotary positive displacement pumps. By way of example, for gear and progressive cavity pumps, the tune function can also restore flow accuracy by compensating for pump wear.

In comparison, twin screw positive displacement pump flow calculations—flow estimations for twin screw positive displacement pumps rely upon accurate rating curves to estimate pump flow. Published performance for certain types of positive displacement pumps have been found to differ from actual performance. The tune function described above will correct the calculated flow value based on published performance to reflect actual pump performance for twin screw positive displacement pumps.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

I claim:

1. Apparatus comprising:
   a twin screw positive displacement pump having a module configured to provide signaling containing information about actual pump performance data for actual rated conditions captured during a tuning function related to the operation of the twin screw positive displacement pump, and to receive a control signal containing information about an actual flow value and control the operation of the twin screw positive displacement pump based on the received control signal; and
   a signal processor configured to
     receive the signaling;
     determine corrected pump performance data to operate the twin screw positive displacement pump by compensating pump performance data being used for operating the twin screw positive displacement pump based at least partly on the actual pump performance data for the actual rated conditions captured during the tuning function;
     determine the actual flow value based at least partly on the corrected pump performance data; and
     provide the control signal containing information about the actual flow value to control the operation of the twin screw positive displacement pump;
   wherein the corrected pump performance data include corrected published pump performance data having a corrected published rated power; and
   wherein the signal processor is configured to determine the corrected published rated power by compensating a published rated power based at least partly on actual power, specific gravity and viscosity at the actual rated conditions.

2. Apparatus according to claim 1, wherein the corrected published pump performance data further comprise a rated slip factor compensated for the actual rated conditions.

3. Apparatus according to claim 2, wherein the signal processor is configured to determine the corrected published rated power based upon the following equation:

$$RTD\ HP_{CORR} = HP_{ACT} \times (SG_{RTD}/SG_{ACT})/(VISC_{ACT}/VISC_{RTD})^N,$$

where:
  $RTD\ HP_{CORR}$ is the corrected published rated power in the form of rated hp corrected for specific gravity and viscosity,
  $HP_{ACT}$ is the actual power at rated conditions,
  $SG_{RTD}$ is the rated specific gravity of the pumped liquid,
  $SG_{ACT}$ is the actual specific gravity of the pumped liquid,
  $VISC_{RTD}$ is the rated viscosity of the pumped liquid,
  $VISC_{ACT}$ is the actual viscosity of the pumped liquid, and
  N is an exponent which varies by the type of pump.

4. Apparatus according to claim 3, wherein N equals about 0.275 for twin screw positive displacement pumps.

5. Apparatus according to claim 4, wherein the signal processor is configured to determine the rated slip factor compensated for the actual rated conditions based upon the following equation:

$$KS = (VISC_{RTD} \times Q_{NO\ SLIP} \times (Q_{NO\ SLIP} - Q_{RATED})/(75.415 \times K_G \times (N_{RATED}) \times T_{RTD\ CORR}),$$

where:
  KS is the rated slip factor compensated for the actual rated conditions,
  $VISC_{RTD}$ is the published pump rated viscosity,
  $Q_{NO\ SLIP}$ is the flow in gpm at rated speed and rated viscosity at 0 psid differential pressure,
  $K_G = 0.004329$, a design constant,
  $N_{RATED}$ = Rated Pump Speed for the application, and
  $T_{RTD\ CORR}$ = Corrected Rated Torque in Ft-Lbs (US), which is determined as follows: $T_{RTD\ CORR} = (5252 \times RTD\ HP_{CORR})/N_{RTD}$.

6. Apparatus according to claim 5, wherein the signal processor is configured to determine an actual flow value for the twin screw positive displacement pump based upon the following equation:

$$Q_{ACT\ CORR} = (Q_{NO\ SLIP} \times ((N_{MOTOR}/RATIO)/N_{RATED})) - (((75.415 \times K_G \times KS_{CORR}) \times (N_{MOTOR}/RATIO) \times TACT_{CORR})/(VISCOSITY_{ACT} \times Q_{NO\ SLIP}),$$

where:
  $Q_{NO\ SLIP}$ is the flow in gpm at rated speed and rated viscosity at 0 psid differential pressure,
  $N_{MOTOR}$ = the current motor speed,
  RATIO = the ratio of speed reduction if a gear reducer is used, If no gear reducer is used than the value of the RATIO=1.0,
  $N_{RATED}$ = the Rated Pump Speed for the application,
  $K_G = 0.004329$, a design constant,
  $KS_{CORR}$ is the corrected rated slip factor based on the slip rules for the operating condition for a particular rotary positive displacement pump type,
  $T_{ACT\ CORR}$ = Torque in Ft-Lbs (US), where $T_{ACT\ CORR} = (5252 \times HP_{ACT\ CORR})/N_{ACT}$, and $HP_{ACT\ CORR} = HP_{ACT} \times (SG_{RTD}/SG_{ACT})$,
  $HP_{ACT}$ = Actual motor power,
  $N_{ACT}$ = Actual pump speed, and
  $VISC_{ACT}$ is the actual viscosity of the pumped liquid.

7. Apparatus according to claim 6, wherein the signal processor is configured to determine slip rules for twin screw positive displacement pumps based upon Table IB below:

| Changing Variable | Corrected Slip Factor "$KS_{CORR}$" |
|---|---|
| Torque | SLIP FACTOR is Constant; $KS_{CORR}$ = KS |
| Speed | $KS_{CORR}$ = KS * $(N_{RATED}/N_{ACT})$ |
| Speed and Torque | KSCORR = KS * (NRATED/NACT) |
| Viscosity | $KS_{CORR}$ = KS * $(Visc_{ACT}/Visc_{RATED})^0.4$ |

-continued

| Changing Variable | Corrected Slip Factor "$KS_{CORR}$" |
|---|---|
| Speed and Viscosity | $KS_{CORR} = KS * (N_{RATED}/N_{ACT}) * (Visc_{ACT}/Visc_{RATED})^{0.4}$ |
| Torque and Viscosity | $KS_{CORR} = KS * (Visc_{ACT}/Visc_{RATED})^{0.4}$ |
| Speed, Torque and Viscosity | $KS_{CORR} = KS * (N_{RATED}/N_{ACT}) * (Visc_{ACT}/Visc_{RATED})^{0.4}$ |

8. Apparatus according to claim 7, wherein the signal processor is configured to determine the result of the flow calculation as follows:

$Q_{ACT\ CORR} = Q_{ACT}$, and the $Q_{ACT\ CORR}$ is displayed as the actual flow ($Q_{ACT}$) in Gpm.

9. Apparatus according to claim 8, wherein the signal processor is configured to determine the parameters for actual and rated pump speed as follows:

$N_{ACT}$=Actual pump speed, and $N_{RTD}$=Rated pump speed of the application.

10. Apparatus according to claim 1, wherein the actual pump performance data includes information about actual speed, actual power, actual specific gravity and actual viscosity related to the operation of the twin screw positive displacement pump.

11. Apparatus according to claim 10, wherein the corrected pump performance data include corrected published pump performance data having a corrected published rated power and a rated slip factor compensated for the actual rated conditions.

12. Apparatus according to claim 1, wherein the signal processor is configured to determine a value for a rated flow for the twin screw positive displacement pump based upon published pump performance data that is not corrected or compensated.

13. Apparatus according to claim 12, wherein the signal processor is configured to determine a rated slip factor compensated for the actual rated conditions based at least partly on the rated flow and a corrected rated torque.

14. Apparatus according to claim 13, wherein the signal processor is configured to activate the tune function and replace published values for the rated power and rated slip factor with the corrected rated power and the rated slip factor compensated for the actual rated conditions.

15. Apparatus according to claim 14, wherein the signal processor is configured to determine the actual flow value based at least partly on deducting a corrected rated slip flow from a theoretical displacement flow.

16. Apparatus according to claim 14, wherein the signal processor is configured to use the corrected rated power and the rated slip factor compensated for the actual rated conditions until another tune function is initiated.

17. Apparatus according to claim 1, wherein the signal processor comprises, or takes the form of, a controller or controller module configured to control the operation of the twin screw positive displacement pump.

18. Apparatus according to claim 1, wherein the signaling contains information about pump parameters, including some combination of a pump type, a rated flow, a published rated speed, a published rated power, a published rated viscosity, a published rated specific gravity and no slip flow, and information about actual speed and power from a variable frequency drive (VFD) along with actual specific gravity and viscosity data; and the signal processor is configured to determine a corrected slip flow or factor based at least partly on the signaling.

19. Apparatus according to claim 18, wherein the signal processor is configured to determine the actual flow value based at least partly on deducting a corrected rated slip flow or factor from a theoretical displacement flow or factor.

20. Apparatus according to claim 19, wherein the signal processor is configured to determine the corrected rated slip flow or factor without using sensors based at least partly on a constant temperature application where specific gravity and viscosity are constant.

21. Apparatus according to claim 19, wherein, in applications with varying temperature, the signal processor is configured to receive a temperature measurement and determine the corrected rated slip factor by compensating changing conditions, including actual speed, specific gravity and viscosity, based at least partly on the same.

22. A method comprising:

configuring a twin screw positive displacement pump with a module to provide signaling containing information about actual pump performance data for actual rated conditions captured during a tuning function related to the operation of the twin screw positive displacement pump, and to receive a control signal containing information about an actual flow value and control the operation of the twin screw positive displacement pump based on the received control signal; and receiving with a signal processor the signaling;

determining with the signal processor corrected pump performance data to operate the twin screw positive displacement pump by compensating pump performance data being used for operating the twin screw positive displacement pump based at least partly on the actual pump performance data for the actual rated conditions captured during the tuning function;

determine the actual flow value based at least partly on the corrected pump performance data; and provide the control signal containing information about the actual flow value to control the operation of the twin screw positive displacement pump;

wherein the corrected pump performance data include corrected published pump performance data having a corrected published rated power, and the method further comprises determining with the signal processor the corrected published rated power by compensating a published rated power based at least partly on actual power, specific gravity and viscosity at the actual rated conditions.

23. A method according to claim 22, wherein the corrected published pump performance data further comprise a rated slip factor compensated for the actual rated conditions.

24. A method according to claim 23, wherein the method comprises determining with the signal processor the corrected published rated power based upon the following equation:

$$RTD\ HP_{CORR} = HP_{ACT} \times (SG_{RTD}/SG_{ACT})/(VISC_{ACT}/VISC_{RTD})^N,$$

where:

RTD $HP_{CORR}$ is the corrected published rated power in the form of rated hp corrected for specific gravity and viscosity, $HP_{ACT}$ is the actual power at rated conditions, $SG_{RTD}$ is the rated specific gravity of the pumped liquid, $SG_{ACT}$ is the actual specific gravity of the pumped liquid, $VISC_{RTD}$ is the rated viscosity of the pumped liquid, $VISC_{ACT}$ is the actual viscosity of the pumped liquid, and N is an exponent which varies by the type of pump.

25. A method according to claim 24, wherein N equals about 0.275 for twin screw pumps.

26. A method according to claim 24, wherein the method comprises determining with the signal processor the rated slip factor compensated for the actual rated conditions based upon the following equation:

$$KS = (VISC_{RTD} \times Q_{NO\ SLIP} \times (Q_{NO\ SLIP} - Q_{RATED}) / (75.415 \times K_G \times (N_{RATED}) \times T_{RTD\ CORR}),$$

where:
KS is the rated slip factor compensated for the actual rated conditions,
$VISC_{RTD}$ is the published pump rated viscosity,
$Q_{NO\ SLIP}$ is the flow in gpm at rated speed and rated viscosity at 0 psid differential pressure,
$K_G = 0.004329$, a design constant,
$N_{RATED}$=Rated Pump Speed for the application, and
$T_{RTD\ CORR}$=Corrected Rated Torque in Ft-Lbs (US), which is determined as follows: $T_{RTD\ CORR}$=(5252× RTD $HP_{CORR})/N_{RTD}$.

27. A method according to claim 26, wherein the method comprises determining with the signal processor an actual flow value for the twin screw positive displacement pump based upon the following equation:

$$Q_{ACT\ CORR} = (Q_{NO\ SLIP} \times ((N_{MOTOR}/\text{RATIO})/N_{RATED})) - (((75.415 \times K_G \times KS_{CORR}) \times (N_{MOTOR}/\text{RATIO}) \times TACT_{CORR})/(VISCOSITY_{ACT} \times Q_{NO\ SLIP}),$$

where:
$Q_{NO\ SLIP}$ is the flow in gpm at rated speed and rated viscosity at 0 psid differential pressure,
$N_{MOTOR}$=the current motor speed,
RATIO=the ratio of speed reduction if a gear reducer is used, If no gear reducer is used than the value of the RATIO=1.0,
$N_{RATED}$=the Rated Pump Speed for the application,
$K_G = 0.004329$, a design constant,
$KS_{CORR}$ is the corrected rated slip factor determined from slip rules for the operating condition for a particular twin screw positive displacement pump type,
$T_{ACT\ CORR}$=Torque in Ft-Lbs (US), where $T_{ACT\ CORR}$ = $(5252 \times HP_{ACT\ CORR})/N_{ACT}$, and $HP_{ACT\ CORR} = HP_{ACT} \times (SG_{RTD}/SG_{ACT})$,
$HP_{ACT}$=Actual motor power,
$N_{ACT}$=Actual pump speed, and
$VISC_{ACT}$ is the actual viscosity of the pumped liquid.

28. A method according to claim 27, wherein the method comprises determining slip rules for twin screw positive displacement pumps based upon on Table IB below:

| Changing Variable | Corrected Slip Factor "$KS_{CORR}$" |
| --- | --- |
| Torque | SLIP FACTOR is Constant; $KS_{CORR}$ = KS |
| Speed | $KS_{CORR}$ = KS * $(N_{RATED}/N_{ACT})$ |
| Speed and Torque | KSCORR = KS * (NRATED/NACT) |
| Viscosity | $KS_{CORR}$ = KS * $(Visc_{ACT}/Visc_{RATED})^{0.4}$ |
| Speed and Viscosity | $KS_{CORR}$ = KS * $(N_{RATED}/N_{ACT})$ * $(Visc_{ACT}/Visc_{RATED})^{0.4}$ |
| Torque and Viscosity | $KS_{CORR}$ = KS * $(Visc_{ACT}/Visc_{RATED})^{0.4}$ |
| Speed, Torque and Viscosity | $KS_{CORR}$ = KS * $(N_{RATED}/N_{ACT})$ * $(Visc_{ACT}/Visc_{RATED})^{0.4}$ |

29. A method according to claim 28, wherein the method comprises determining the result of the flow calculation as follows:

$Q_{ACT\ CORR} = Q_{ACT}$, and
the $Q_{ACT\ CORR}$ is displayed as the actual flow ($Q_{ACT}$) in Gpm.

30. A method according to claim 29, wherein the method comprises determining the parameters for actual and rated pump speed as follows:
$N_{ACT}$=Actual pump speed, and
$N_{RTD}$=Rated pump speed of the application.

31. A method according to claim 22, wherein the actual pump performance data contains information about actual speed, actual power, actual specific gravity and actual viscosity related to the operation of the twin screw positive displacement pump.

32. A method according to claim 31, wherein the corrected pump performance data include corrected published pump performance data having a corrected published rated power and a rated slip factor compensated for the actual rated conditions.

33. A method according to claim 22, wherein the method comprises using a value for a rated flow for the twin screw positive displacement pump based upon published pump performance data.

34. A method according to claim 33, wherein the method comprises determining with the signal processor a rated slip factor compensated for the actual rated conditions based at least partly on the rated flow and a corrected rated torque.

35. A method according to claim 34, wherein the method comprises activating with the signal processor the tune function which replaces the rated power and the rated slip factor with the corrected rated power and the rated slip factor compensated for the actual rated conditions.

36. A method according to claim 35, wherein the method comprises determining with the signal processor an actual flow value based at least partly on deducting a corrected rated slip flow from a theoretical displacement flow.

37. A method according to claim 35, wherein the method comprises using the corrected rated power and rated slip factor until another tune function is initiated.

38. A method according to claim 22, wherein the method comprises controlling the operation of the twin screw positive displacement pump with a controller or controller module having the signal processor.

39. A method according to claim 22, wherein the signaling contains information about pump parameters, including some combination of a pump type, a rated flow, a published rated speed, a published rated power, a published rated viscosity, a published rated specific gravity and no slip flow, and information about actual speed and power from a variable frequency drive (VFD) along with actual specific gravity and viscosity data; and the method comprises determining with the signal processor a corrected slip flow or factor based at least partly on the signaling.

40. A method according to claim 39, wherein the method comprises determining with the signal processor an actual flow value based at least partly on deducting a corrected rated slip flow or factor from a theoretical displacement flow or factor.

41. A method according to claim 40, wherein the method comprises determining with the signal processor the corrected rated slip flow or factor without using sensors based at least partly on a constant temperature application where specific gravity and viscosity are constant.

42. A method according to claim 40, wherein, in applications with varying temperature, the method comprises receiving with the signal processor a temperature measurement and determining the corrected rated slip flow or factor by compensating changing conditions, including actual speed, specific gravity and viscosity, based at least partly on the same.

* * * * *